United States Patent [19]

Taggart

[11] Patent Number: 5,653,503
[45] Date of Patent: Aug. 5, 1997

[54] VEHICLE SEAT TRIM COVER RETAINER

[75] Inventor: Russell C. Taggart, White Lake, Mich.

[73] Assignee: Atoma International of America, Inc., Livonia, Mich.

[21] Appl. No.: 627,481

[22] Filed: Apr. 4, 1996

Related U.S. Application Data

[62] Division of Ser. No. 386,417, Feb. 10, 1995, Pat. No. 5,586,807.

[51] Int. Cl.⁶ .................................................. A47C 31/02
[52] U.S. Cl. ................... 297/218.5; 24/336; 297/452.59
[58] Field of Search ............................. 24/336, 339, 326, 24/350, 562, 531; 297/218.5, 218.3, 218.1, 228.13, 452.59

[56] References Cited

U.S. PATENT DOCUMENTS

| | | |
|---|---|---|
| 1,236,761 | 8/1917 | Repstein . |
| 1,958,934 | 5/1934 | Williams . |
| 2,888,725 | 6/1959 | Cudd . |
| 3,371,900 | 3/1968 | Jacobs . |
| 3,423,775 | 1/1969 | Cockerill . |
| 3,513,806 | 5/1970 | Ferrick . |
| 3,965,540 | 6/1976 | Moore . |
| 4,050,187 | 9/1977 | Geiger et al. . |
| 4,900,184 | 2/1990 | Cleveland . |
| 4,947,526 | 8/1990 | Fogelman . |
| 5,231,739 | 8/1993 | Mattesky . |
| 5,401,075 | 3/1995 | Venuto et al. . |
| 5,409,198 | 4/1995 | Roick . |

FOREIGN PATENT DOCUMENTS

| | | |
|---|---|---|
| 2340831 | 3/1974 | Germany . |
| 2928473 | 1/1981 | Germany . |
| 885372 | 12/1961 | United Kingdom . |

*Primary Examiner*—James R. Brittain
*Attorney, Agent, or Firm*—Cushman Darby & Cushman IP Group of Pillsbury Madison & Sutro LLP

[57] ABSTRACT

A retainer is provided for securing first and second ends of a trim cover of a vehicle seatback to a portion of a frame of the vehicle seatback such that the first and second trim cover ends are in generally adjacent relation when the retainer is fixed to the frame portion. The retainer includes a first elongate body having a base portion and first and second arms extending in spaced relation from the base portion defining a first, open-ended channel therebetween. A second elongate body has a base portion and first and second arms extending in spaced relation from the base portion thereof defining a second, open-ended channel therebetween. The second arm of the second body is coupled to the first body in such a manner that (1) a longitudinal axis of the first body is in parallel relation with a longitudinal axis of the second body and (2) an open end of the first channel is oriented at an angle of at least 180° with respect to an open end of the second channel. A planar portion extends from the first arm of the first body in parallel relation with the second arm of the first body. The planar portion is constructed and arranged to be coupled to the first end of the trim cover by sewing. The first channel is constructed and arranged to receive the frame portion so as to be in secured relation therewith and the second channel is constructed and arranged to receive the second end of the trim cover. A method of securing a trim cover to a vehicle seatback frame is also provided.

5 Claims, 2 Drawing Sheets

5,653,503

VEHICLE SEAT TRIM COVER RETAINER

This is a division of application Ser. No. 08/386,417, filed Feb. 10, 1995 now U.S. Pat. No. 5,586,807.

BACKGROUND OF THE INVENTION

The present invention relates to securing a vehicle seatback trim cover to a portion of the seatback frame, and more particularly, to a retainer for securing two ends of a trim cover to a frame at a single location.

With reference to FIG. 1, in a vehicle seatback 10 incorporating a child seat module 12, the module 12 is typically disposed between two bolster portions 14 and 16 of the vehicle seatback 10. A trim cover 18 is fitted over the respective bolster portions. Each end of the trim cover 18 includes a conventional rope listing 20 sewn thereto which is used to secure the trim cover to the frame.

As shown in FIG. 1, to cover bolster portion 14 with the trim cover 18, one end of the trim cover 18 is disposed adjacent a portion 22 of the frame. The trim cover 18 is then wrapped around a peripheral surface of the bolster portion 14 such that the ends of the trim cover are disposed generally adjacent to each other. Conventional hog rings 24 are then used to fix the rope listing ends of the trim cover to the frame portion 22.

The hog rings 24 are typically delivered using conventional air-operated devices, whereby manual actuation of a trigger delivers and secures the hog ring at the desired location. Such devices, however, are cumbersome, often weighing a few pounds or more. It has been found that continuous handling of the device and repeated actuation of the trigger during the assembly procedure may lead to operator injury, such as the development of carpal tunnel. Further, when using conventional hog rings in the assembly, it is difficult to perform any required adjustment of the trim cover once secured to the frame.

Accordingly, it can be appreciated that a need exists to provide a simple and cost effective way of securing a trim cover to a seatback frame which overcomes the inadequacies of the conventional methods.

SUMMARY OF THE INVENTION

An object of the present invention is to fulfill the need referred to above. In accordance with the principles of the present invention, this objective is obtained by providing a retainer for securing first and second ends of a trim cover of a vehicle seatback to a portion of a frame thereof such that the first and second trim cover ends are in generally adjacent relation when the retainer is fixed to the frame portion. The retainer includes a first elongate body having a base portion and first and second arms extending in spaced relation from the base portion defining a first, open-ended channel therebetween.

A second elongate body has a base portion and first and second arms extending in spaced relation from the base portion thereof defining a second, open-ended channel therebetween. The second arm of the second body is coupled to the first body in such a manner that (1) a longitudinal axis of the first body is in parallel relation with a longitudinal axis of the second body and (2) an open end of the first channel is oriented at an angle of at least 180° with respect to an open end of the second channel.

A planar portion extends from the first arm of the first body in parallel relation with the second arm of the first body. The planar portion is constructed and arranged to be coupled to the first end of the trim cover by sewing.

The first channel is constructed and arranged to receive the frame portion so as to be in secured relation therewith and the second channel is constructed and arranged to receive the second end of the trim cover.

Another object of the invention is to provide a method of securing a trim cover of a vehicle seatback to a frame portion thereof using a resilient retainer. The retainer has first and second open-ended channels and a planar portion. The trim cover has first and second ends. The first end of the trim cover is sewn to the planar portion of the retainer and the second end has a flange member sewn thereto. The method includes the steps of coupling the retainer to the frame portion such that the frame portion is secured in the first, open-ended channel of the retainer. A peripheral surface of a bolster portion of the vehicle is covered with the trim cover and the second end of the trim cover is brought into a position generally adjacent the first end thereof. Finally, the flange member is inserted into the second open-ended channel of the retainer such that the flange member is secured therein.

In accordance with yet another object of the invention, a vehicle seatback assembly is provided with includes a seatback frame having at least one generally vertically disposed rod member; a child seat module mounted on the seatback frame; a bolster portion mounted on the seatback frame adjacent the child seat module; a trim cover having first and second ends, the trim cover covering a peripheral surface of the bolster portion; and a retainer coupled to the first end of the trim cover and in engagement with the rod member. The retainer is constructed and arranged to secure the second end of the trim cover with respect to the rod member such that the first and second ends of the trim portion are disposed generally adjacent to each other and fixed with respect to the rod member.

Other objects, features and characteristics of the present invention, as well as the function of the related elements of the structure, and the combination of parts and economies of manufacture, will become more apparent upon consideration of the following detailed description and the appended claims with reference to the accompanying drawings all of which form a part of this specification.

DETAILED DESCRIPTION OF THE PRESENTLY PREFERRED EXEMPLARY EMBODIMENT

Figure 1:
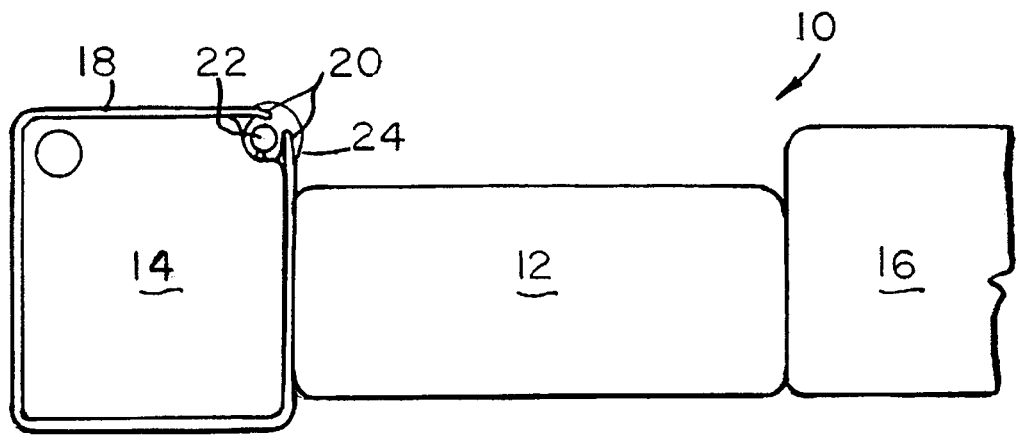
FIG. 1 is a schematic, plan illustration showing a trim cover assembled to a bolster portion of a vehicle seatback employing a child's seat module, using a conventional technique.

Referring to the drawings, a retainer is shown, generally indicated at 100, which embodies the principles of the present invention.

Figure 3:
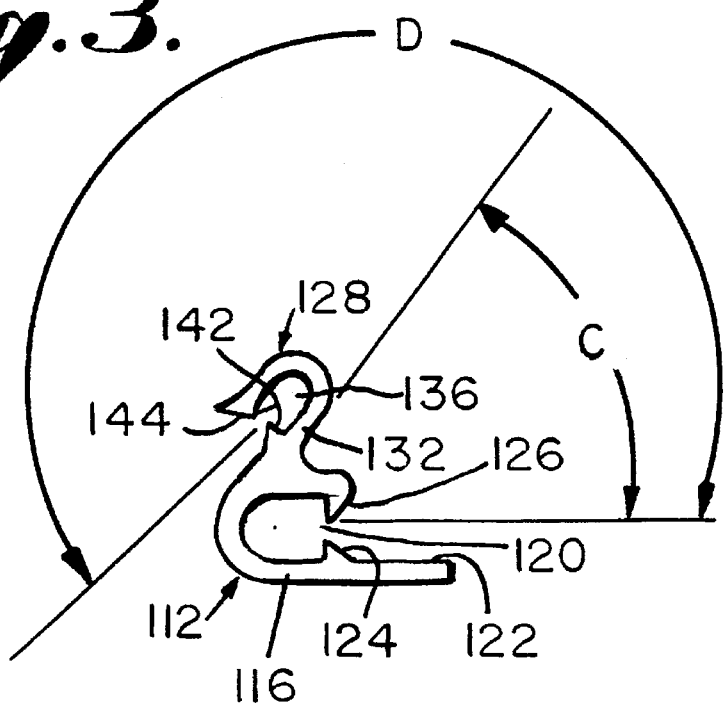
FIG. 3 is an end view of the retainer of FIG. 2.

The retainer 100 includes a first elongate body 112 having a curved base portion 114 and first and second respective arms 116, 118, extending in spaced relation from the base portion 114 so as to define a generally U-shaped or open-ended channel 120 therebetween. A planar portion 122 extends from the first arm 116 in parallel relation with the second arm 118. Barbs 124 extend from each of the first and second arms 116, 118 into the channel 120. The barbs 124 are in opposing relation and define retaining structure constructed and arranged to retain an object received in the U-shaped channel 120. As shown in FIG. 3, each barb 124 includes a camming surface 126 which helps direct an object being inserted into the U-shaped channel 120.

The retainer 100 includes a second elongate body 128 having a curved base portion 130 and first and second respective arms 132, 134 extending in spaced relation from the base portion 130. The arms 132 and 134 define a second, generally U-shaped or open-ended channel 136 therebetween. The second arm 132 of the second body 128 is coupled to the first body 112 in such a manner that a longitudinal axis A of the first body is in parallel relation with a longitudinal axis B of the second body. Further, an open-end of the first channel 120 is oriented at an angle of at least 180° with respect to the open end of the second channel 136.

In the illustrated embodiment (FIG. 3), the second arm 132 of the second body 128 is disposed at an angle C of approximately 45° with respect to the first arm 116 of the first body 112, such that the open end of the second channel 136 is oriented at an angle D of approximately 225° from the open end of the first channel 120, the function of which will become apparent below.

The second body 128 includes barbs 142 (FIG. 3) extending from each of the first and second arms thereof into channel 136, which, like the barbs 124 of first body, define retaining structure constructed and arranged to retain an object received in the U-shaped channel 136 of the second body 128. Further, the second body 128 includes a camming surface 144 defined at a distal end of the first arm thereof for directing an object into the second channel 136.

Preferably, the retainer 100 is formed integrally from resilient, plastic material such as, for example, polyproplene, or similar material. The retainer 100 must be rigid enough to provide a retaining function, yet permit a trim cover to be sewn to the planar portion thereof, as will be explained below. The overall length of the retainer 100 is not critical and may be adapted for the particular assembly required.

Figure 4:
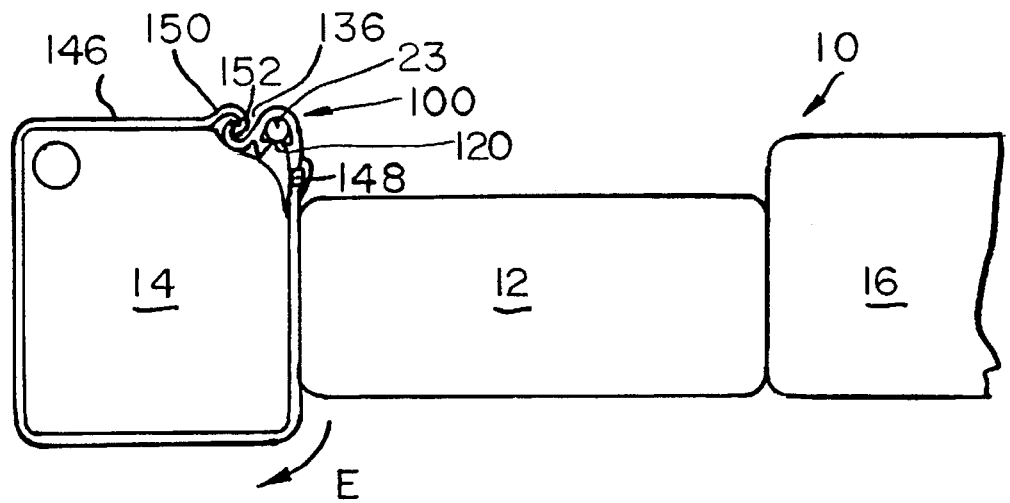
FIG. 4 is a schematic, plan illustration showing the retainer of the invention securing ends of a trim cover to a portion of a vehicle seatback frame.
Figure 2:
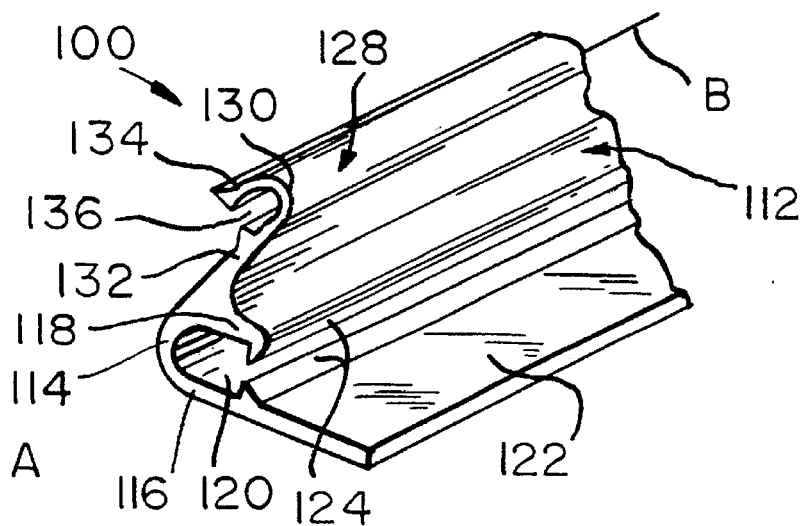
FIG. 2 is a partial perspective view of the retainer in accordance with the principles of the present invention.

The use of the retainer 100 in fastening ends of a trim cover 146 to a portion of a vehicle seatback frame will be appreciated with reference to FIG. 4 and from the discussion below.

First, the trim cover 146 is prepared by sewing a conventional, resilient flange member 152, for example, profile number P-821 manufactured by Bemis, to the second end 150 thereof. The first end 148 of the trim cover 146 is folded-over upon the trim cover and sewn to the planar portion 122 of the retainer 100. Next, the retainer 100 is snapped onto a generally cylindrical rod member 23, which is coupled to the seatback frame and extends vertically therefrom. The rod member 23 is received in the first channel 120 of the retainer 100 and held therein by the barbs 124. The second end 150 of the trim cover 146 is then moved about a peripheral surface of the bolster portion 14 of the vehicle seatback in the direction of arrow E in FIG. 4, until the second end 150 is disposed generally adjacent to the first end 148. Since the second channel 136 opens in a direction generally opposite to the direction in which the first channel 120 opens, the resilient flange member 152 may then be inserted into the second channel 136 of the retainer and held therein by the barbs 142 thereof.

Thus, it can be appreciated that the two ends of the trim cover 146 may be coupled to the frame at a single location.

In securing the ends of the trim cover to the vehicle seatback frame, there is no need to use hog rings or the air-operated device associated therewith, since the retainer of the invention permits a manual assembly procedure, requiring no special tools. Further, since the retainer 100 merely snaps onto the rod member 23 of the frame, and the resilient flange member 152 is simply pushed into the second U-shaped channel 136, an adjustment of the trim cover 146 may be performed easily if required. Such adjustment is possible since the retainer can be moved with respect to the rod member and/or the flange member can be moved with respect to the retainer.

It can be seen that the retainer of the present invention provides an effective means of coupling ends of a trim cover to a portion of the frame at one location. Since the use of the retainer requires no tools, the likelihood of operator injury is decreased, and the assembly time is substantially reduced.

While the invention has been described in connection with what is presently considered to be the most practical and preferred embodiment, it is understood that the invention is not limited to the disclosed embodiment, but, on the contrary, is intended to cover various modification and equivalent arrangements included with the spirit and scope of the appended claims.

What is claimed is:

1. A vehicle seatback assembly comprising:
    a seatback frame having at least one generally vertically disposed rod member;
    a child seat module mounted on said seatback frame;
    at least one bolster portion mounted on said seatback frame adjacent the child seat module;
    a trim cover having first and second ends, said trim cover covering a peripheral surface of the at least one bolster portion; and
    a retainer coupled to said first end of said trim cover and in engagement with said rod member, said retainer being constructed and arranged to secure said second end of said trim cover with respect to said rod member such that said first and second ends of said trim portion are disposed generally adjacent to each other and fixed with respect to said seatback frame,
    wherein said retainer has first and second open-ended channels and a generally planar portion, the first end of the trim cover being coupled to the planar portion, the rod member being received in said first channel and said second end of said trim portion being received in said second channel.

2. The assembly according to claim 1, wherein said trim cover is sewn to said planar portion.

3. A method of securing a trim cover of a vehicle seatback to a frame portion thereof using a resilient retainer, the retainer having first and second open-ended channels and a planar portion, said trim cover having first and second ends, said first end of said trim cover being sewn to said planar portion of said retainer and said second end of said trim cover including a flange member sewn thereto, the method comprising the steps of:
    coupling said retainer to the frame portion such that the frame portion is secured in said first, open-ended channel of said retainer;
    covering a peripheral surface of a bolster portion of the vehicle seatback with said trim cover and bringing said second end of said trim cover into a position generally adjacent said first end thereof; and
    inserting said flange member into said second open-ended channel of said retainer such that said flange member is secured therein.

4. The method according to claim 3, wherein surfaces defining said open-ended channels include retaining structure extending into a respective channel, and wherein the step of coupling said retainer to a portion of said frame includes snapping said retainer onto said frame portion such that said frame portion is disposed within said channel and held therein by said retaining structure; and the step of inserting said resilient flange into said second open-ended channel includes pushing said flange member into said second channel such that the flange is disposed within the second channel and held therein by the retaining structure thereof.

5. A method of securing a trim cover of a vehicle seatback to a frame portion thereof with a retainer, the retainer having first and second open-ended channels, the trim cover having first and second ends, the method comprising the steps of:

folding the first end of the trim portion over and upon the trim cover, and sewing the folded first end to a portion of the retainer, sewing a flange member to the second end of the trim portion, coupling the retainer to the frame portion such that the frame portion is secured in said first open-ended channel of the retainer, covering a peripheral surface of a bolster portion of the vehicle seatback with said trim cover and bringing said second end of said trim cover into a position generally adjacent said first end thereof; and inserting said flange member into said second open-ended channel of said retainer such that said flange member is secured therein.

* * * * *